US011188908B2

(12) United States Patent
Locke et al.

(10) Patent No.: US 11,188,908 B2
(45) Date of Patent: Nov. 30, 2021

(54) MULTI-FUNCTION TRANSACTION CARD

(71) Applicant: Capital One Services, LLC, McLean, VA (US)

(72) Inventors: Tyler Locke, Jersey City, NJ (US); Adam R. Koeppel, Washington, DC (US); Molly Johnson, Alexandria, VA (US); James Zarakas, Centreville, VA (US); David Kelly Wurmfeld, Fairfax, VA (US); Kevan Emmott, Arlington, VA (US); Rajko Ilincic, Annandale, VA (US)

(73) Assignee: Capital One Services, LLC, McLean, VA (US)

( * ) Notice: Subject to any disclaimer, the term of this patent is extended or adjusted under 35 U.S.C. 154(b) by 54 days.

(21) Appl. No.: 16/033,892

(22) Filed: Jul. 12, 2018

(65) Prior Publication Data
US 2020/0019962 A1    Jan. 16, 2020

(51) Int. Cl.
*G06Q 40/00* (2012.01)
*G06Q 20/40* (2012.01)
*G06Q 20/34* (2012.01)

(52) U.S. Cl.
CPC ......... *G06Q 20/401* (2013.01); *G06Q 20/341* (2013.01); *G06Q 20/352* (2013.01)

(58) Field of Classification Search
CPC ............... G06Q 20/10; G06Q 20/4012; G06Q 20/341; G06Q 20/401; G06Q 20/352

(Continued)

(56) References Cited

U.S. PATENT DOCUMENTS

| 6,394,343 B1 | 5/2002 | Berg et al. |
| 6,925,439 B1 * | 8/2005 | Pitroda .................. G06Q 20/02 235/380 |

(Continued)

FOREIGN PATENT DOCUMENTS

| EP | 3203425 A1 * | 8/2017 | ......... G06Q 20/3672 |
| WO | 2016168457 A1 | 10/2016 | |

OTHER PUBLICATIONS

"Security of Proximity Mobile Payments", A Smart Card Alliance Contactless and Mobile Payments Council White Paper, Publication No. CPMC-09001, Publication Date: May 2009 (Year: 2009).*

(Continued)

*Primary Examiner* — Edward J Baird
(74) *Attorney, Agent, or Firm* — Harrity & Harrity, LLP

(57) ABSTRACT

A multi-function transaction card may determine whether to submit a first payment as a passive payment device or to receive a second payment from another transaction card. The multi-function transaction card may have a length and a width that are in accordance with a standard for transaction cards. The multi-function transaction card may selectively perform a payment transaction based on determining whether to submit the first payment or to receive the second payment. The payment transaction may be performed by providing first card data to a transaction terminal for processing when the multi-function transaction card is to submit the first payment. The payment transaction may be performed by receiving second card data from the other transaction card, and processing the second card data via online data authentication, or via offline data authentication, when the multi-function transaction card is to receive the second payment.

16 Claims, 8 Drawing Sheets

(58) Field of Classification Search
USPC .................................................. 705/35–40
See application file for complete search history.

(56) References Cited

U.S. PATENT DOCUMENTS

| | | |
|---|---|---|
| D643,063 S | 8/2011 | Mullen et al. |
| D651,237 S | 12/2011 | Mullen et al. |
| D651,238 S | 12/2011 | Mullen et al. |
| D651,644 S | 1/2012 | Mullen et al. |
| D652,075 S | 1/2012 | Mullen et al. |
| D652,076 S | 1/2012 | Mullen et al. |
| D652,448 S | 1/2012 | Mullen et al. |
| D652,449 S | 1/2012 | Mullen et al. |
| D652,450 S | 1/2012 | Mullen et al. |
| D652,867 S | 1/2012 | Mullen et al. |
| D653,288 S | 1/2012 | Mullen et al. |
| D665,022 S | 8/2012 | Mullen et al. |
| D665,447 S | 8/2012 | Mullen et al. |
| D666,241 S | 8/2012 | Mullen et al. |
| D670,329 S | 11/2012 | Mullen et al. |
| D670,330 S | 11/2012 | Mullen et al. |
| D670,331 S | 11/2012 | Mullen et al. |
| D670,332 S | 11/2012 | Mullen et al. |
| D670,759 S | 11/2012 | Mullen et al. |
| D672,389 S | 12/2012 | Mullen et al. |
| D673,606 S | 1/2013 | Mullen et al. |
| D674,013 S | 1/2013 | Mullen et al. |
| D675,256 S | 1/2013 | Mullen et al. |
| D676,487 S | 2/2013 | Mullen et al. |
| D676,904 S | 2/2013 | Mullen et al. |
| D687,094 S | 7/2013 | Mullen et al. |
| D687,095 S | 7/2013 | Mullen et al. |
| D687,487 S | 8/2013 | Mullen et al. |
| D687,488 S | 8/2013 | Mullen et al. |
| D687,489 S | 8/2013 | Mullen et al. |
| D687,490 S | 8/2013 | Mullen et al. |
| D687,887 S | 8/2013 | Mullen et al. |
| D688,744 S | 8/2013 | Mullen et al. |
| D692,053 S | 10/2013 | Mullen et al. |
| 9,367,790 B2 * | 6/2016 | Avagliano ............. G07F 7/0833 |
| 9,607,189 B2 * | 3/2017 | Gardiner ............ G06K 7/10158 |
| 10,366,378 B1 * | 7/2019 | Han ...................... G06Q 20/204 |
| 2009/0143104 A1 | 6/2009 | Loh et al. |
| 2011/0119497 A1 * | 5/2011 | Tsai ................... G06Q 20/3563 713/185 |
| 2011/0246317 A1 * | 10/2011 | Coppinger ............. G06Q 20/10 705/17 |
| 2013/0030997 A1 * | 1/2013 | Spodak ........... G06K 19/06187 705/41 |
| 2013/0092741 A1 | 4/2013 | Loh et al. |
| 2013/0139230 A1 | 5/2013 | Koh et al. |
| 2013/0218657 A1 * | 8/2013 | Salmon .................. G06Q 10/00 705/14.29 |
| 2013/0282570 A1 | 10/2013 | Charrat et al. |
| 2014/0156535 A1 * | 6/2014 | Jabbour ............. G06Q 20/4012 705/72 |
| 2014/0256251 A1 * | 9/2014 | Caceres .............. H04W 12/084 455/41.1 |
| 2014/0263625 A1 * | 9/2014 | Smets .................. G06Q 20/352 235/380 |
| 2015/0118958 A1 * | 4/2015 | Jain ...................... G06Q 20/204 455/41.1 |
| 2015/0339659 A1 | 11/2015 | Ballesteros |
| 2016/0140558 A1 * | 5/2016 | Groarke .............. G06Q 20/401 705/44 |
| 2017/0289153 A1 * | 10/2017 | Raziel ................. H04L 63/0853 |
| 2018/0308087 A1 * | 10/2018 | Maimon ............ G06Q 20/3552 |
| 2019/0156330 A1 * | 5/2019 | Altenhofen ............ G06Q 20/20 |

OTHER PUBLICATIONS

International Search Report and Written Opinion for Application No. PCT/US2019/039805, dated Oct. 22, 2019, 12 pages.

* cited by examiner

MULTI-FUNCTION TRANSACTION CARD

BACKGROUND

A contactless transaction involves the use of a transaction card (e.g., a credit card, a debit card, and/or the like) and a transaction terminal (e.g., a point of sale (PoS) terminal) without a need for the transaction card to contact the transaction terminal to process the transaction.

SUMMARY

According to some possible implementations, a method may include determining, by a multi-function transaction card, whether to submit a first payment as a passive payment device or to receive a second payment from another transaction card, the multi-function transaction card having a length and a width that are in accordance with a standard for transaction cards; and selectively performing, by the multi-function transaction card, a payment transaction based on determining whether to submit the first payment or to receive the second payment, the payment transaction being performed by providing first card data to a transaction terminal for processing when the multi-function transaction card is to submit the first payment, or the payment transaction being performed by receiving second card data from the other transaction card, and processing the second card data via online data authentication, or via offline data authentication, when the multi-function transaction card is to receive the second payment.

According to some possible implementations, a transaction card device may include a card body having dimensions that are in accordance with a standard for payment cards; a host controller configured to communicate with user devices; a near field communication (NFC) element configured to communicate with NFC-enabled devices; and a secure element communicatively coupled to the host controller and the NFC element, the secure element including: one or more memories, the one or more memories storing first data regarding the transaction card device; and one or more processors, communicatively coupled to the one or more memories, configured to: based on a request, received by the NFC element and from a first NFC-enabled device, to provide the first data in relation to a first transaction, cause the NFC element to transmit the first data to the first NFC-enabled device, and, based on an instruction to obtain, from a second NFC-enabled device, second data in relation to a second transaction: cause the NFC element to obtain the second data from the second NFC-enabled device; and perform online data authentication of the second NFC-enabled device, or offline data authentication of the second NFC-enabled device, based on the second data.

According to some possible implementations, a transaction apparatus may include an enclosure having dimensions that are in accordance with a standard for payment cards; a main controller; a communication element configured to communicate with contactless transaction devices; and a secure element communicatively coupled to the main controller and the communication element, the secure element including: one or more memories, the one or more memories storing first data regarding the transaction apparatus; and one or more processors, communicatively coupled to the one or more memories, configured to: based on an instruction to obtain second data, from a particular contactless transaction device, in relation to a particular transaction: cause the communication element to obtain the second data from the particular contactless transaction device; and perform online data authentication of the particular contactless transaction device, or offline data authentication of the particular contactless transaction device, based on the second data.

DETAILED DESCRIPTION

Figure 1A:
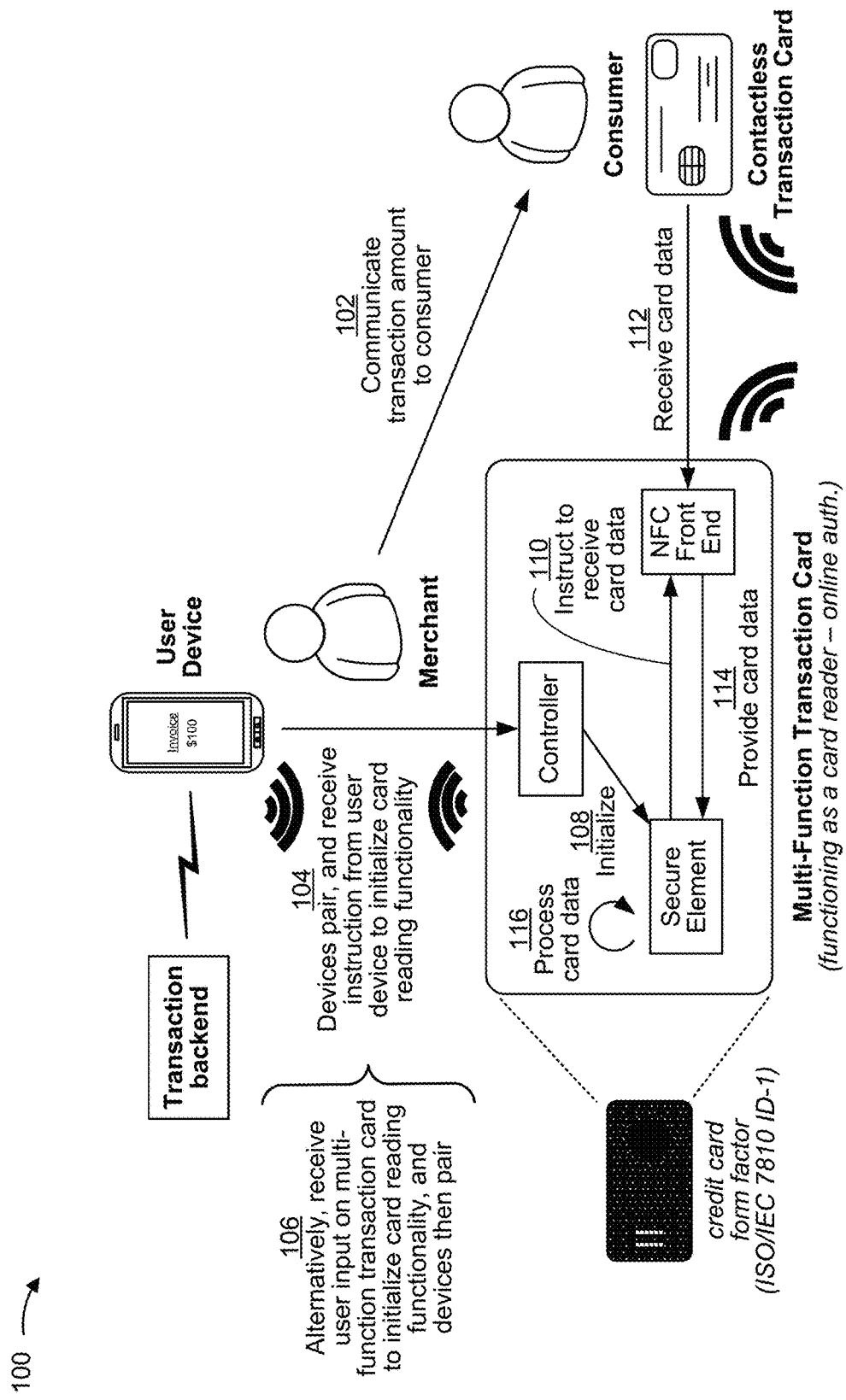
FIGS. 1A-1E are diagrams of an overview of an example implementation described herein.

The following detailed description of example implementations refers to the accompanying drawings. The same reference numbers in different drawings may identify the same or similar elements.

A merchant typically uses a stationary, or portable, card reader, such as a PoS terminal, to process card-based transactions. However, a merchant may not always have a card reader available, or may not have stable, or any, access to a network (e.g., the Internet) to process such transactions. In a peer-to-peer transaction (e.g., to transfer cash), a user typically pays a third-party payment service, which then forwards the payment to an intended recipient. However, the use of such payment services introduces security concerns and allows for misidentification, since only an e-mail address, or a username, of an intended recipient is usually needed to conduct the transaction.

Some implementations, described herein, provide a multi-function transaction card that is capable of interacting with a transaction terminal to submit payments, and interacting with other transaction cards to receive payments. In some implementations, the multi-function transaction card, when functioning as a transaction card reader (e.g., a smart card reader), is capable of conducting online or offline data authentication of another transaction card (e.g., in accordance with EUROPAY®, MASTERCARD®, VISA® (EMV)-based procedures). For example, the multi-function transaction card is capable of providing card data, relating to the other transaction card, to a user device for forwarding to a transaction backend for processing. As another example, the multi-function transaction card is capable of performing offline data authentication of a transaction card, and storing (e.g., locally) resulting validation information for submission (e.g., via the user device) to a transaction backend at a later point. In some implementations, the multi-function transaction card is capable of permitting a user to conduct cash-based transfers (e.g., with one or more other multi-function transaction cards having the same capabilities) in peer-to-peer transactions. In some implementations, the multi-function transaction card is implemented in a form factor that is in accordance with a standard for transaction cards (e.g., International Organization for Standardization/International Electrotechnical Commission (ISO/IEC) 7810 ID-1).

In this way, a user can utilize a single, multi-function transaction card, in a familiar and widely used form factor, to both submit and accept payments. This reduces or eliminates a need for the user to procure, and carry around, a dedicated transaction card reader, which reduces costs. This also reduces or eliminates a need for the user to rely on a payment service provider to process transactions, which reduces transaction costs. In addition, a multi-function transaction card, that enables a user to conduct cash-based transfers, reduces or eliminates a need for the user to utilize third-party payment provider services, thereby also reducing transaction costs and improving overall transaction security.

FIGS. 1A-1E are diagrams of an overview of an example implementation 100 described herein. As shown in FIG. 1A, example implementation 100 may include a multi-function transaction card (e.g., associated with a merchant), a user device, a transaction backend, a contactless transaction card (e.g., associated with a consumer).

The multi-function transaction card may include a card body having dimensions that are in accordance with a standard. In some implementations, the card body may have dimensions that are in accordance with a standard that is associated with payment cards (e.g., credit cards, debit cards, and/or the like)—e.g., ISO/IEC 7810 ID-1 (e.g., a card body having a size of 85.60 millimeters×53.98 millimeters (3.370 inches×2.125 inches) and rounded corners with a radius of 2.88 millimeters to 3.48 millimeters).

As shown in FIG. 1A, the multi-function transaction card may include, among other components (e.g., as described elsewhere herein), a controller, an NFC front end, and a secure element. In some implementations, the NFC front end may include a processor, such as a microcontroller that is capable of executing application logic. In some implementations, the secure element and the NFC front end (as well as other NFC-related components and/or the like) may be included in a transaction integrated circuit (IC) chip—e.g., an EMV chip.

As described in more detail below, the multi-function transaction card may be capable of functioning as both a transaction card reader (e.g., a reader that reads other transaction cards, such as payment cards (e.g., credit cards, debit cards, and/or the like), to receive payments) and as a payment card (e.g., a card that submits payments to other transaction card readers, such as transaction terminals). In some implementations, the multi-function transaction card may include application logic (e.g., stored in memory in the secure element), such as EMV-based application logic, configured to process card data received from contactless transaction cards, and application logic (e.g., also stored in memory in the secure element) that can be provided to transaction terminals for processing. Thus, a user of the multi-function transaction card may, at times, act as a merchant and accept payments from a consumer's contactless transaction card, and, at other times, act as a consumer to submit payments using the multi-function transaction card.

As shown in FIG. 1A, and as shown by reference number 102, a merchant may communicate a transaction amount to a consumer. For example, the merchant and the consumer may agree to enter into a transaction for goods and/or services, in which the consumer is to pay the merchant via the contactless transaction card. Here, the merchant may input information regarding the transaction (e.g., a transaction amount and/or the like) into the user device (e.g., via a user interface presented on the user device).

As shown by reference number 104, the user device and the multi-function transaction card may pair (e.g., establish a communication session) with one another using a communication protocol (e.g., a personal area network protocol, such as a Bluetooth-based network protocol and/or the like), and the controller of the multi-function transaction card may receive, from the user device, an instruction to initialize card reading functionality of the multi-function transaction card. For example, the merchant may command the user device to provide one or more instructions to the multi-function transaction card to initialize (e.g., wake up) and/or enable the card reading functionality of the multi-function transaction card.

Additionally, or alternatively, and as shown by reference number 106, the multi-function transaction card may receive one or more inputs to initialize the card reading functionality, directly from a user, and the multi-function transaction card and the user device may pair (e.g., establish a communication session) with one another using the communication protocol based on such input(s). For example, the merchant may provide, to the multi-function transaction card (e.g., via one or more input component(s) embedded in a card body of the multi-function transaction card, such as buttons and/or the like—not shown), one or more inputs (e.g., information regarding a transaction) to initialize and/or enable the card reading functionality.

As shown by reference number 108, the controller may initialize the secure element. In some implementations, the secure element may execute one or more applications configured to obtain card data from a transaction card, such as the contactless transaction card. In some implementations, the contactless transaction card may include an EMV chip that contains card data (e.g., stored in a secure element in the contactless transaction card). In some implementations, the multi-function transaction card (e.g., the secure element and/or the NFC front end of the multi-function transaction card) may, in conjunction with the consumer's contactless transaction card, identify the applications, stored on the EMV chip of the consumer's contactless transaction card, that are to be used for processing the transaction, exchange communications to facilitate transaction processing, and/or the like, in accordance with one or more EMV-based procedures.

As shown by reference number 110, the secure element may instruct the NFC front end to receive card data from the consumer's contactless transaction card. For example, the secure element may command the NFC front end to generate an NFC field to activate a corresponding NFC receiver in the contactless transaction card to initiate communications, exchange data, and/or the like. In some implementations, the card data may include account information associated with the contactless transaction card, security information, such as cryptographic-based information, and/or the like. As shown by reference number 112, the NFC front end may receive the card data from the contactless transaction card, and as shown by reference number 114, the NFC front end may provide the received card data to the secure element. As shown by reference number 116, the secure element may process the card data (e.g., in accordance with one or more EMV-based procedures).

In some implementations, the secure element may process restrictions (e.g., by determining whether the EMV chip of the contactless transaction card is permitted to enter into the transaction), verify cardholder information (e.g., based on input of a personal identification number (PIN) (e.g., an offline/online PIN), a signature, and/or the like), and/or perform one or more risk management checks (e.g., by determining a floor limit relating to the consumer's contactless transaction card, determining whether there is a requirement for online approval, and/or the like). In some implementations, the secure element may request for, receive, and process any additional card data from the contactless transaction card (e.g., as needed to process the transaction).

Figure 1B:
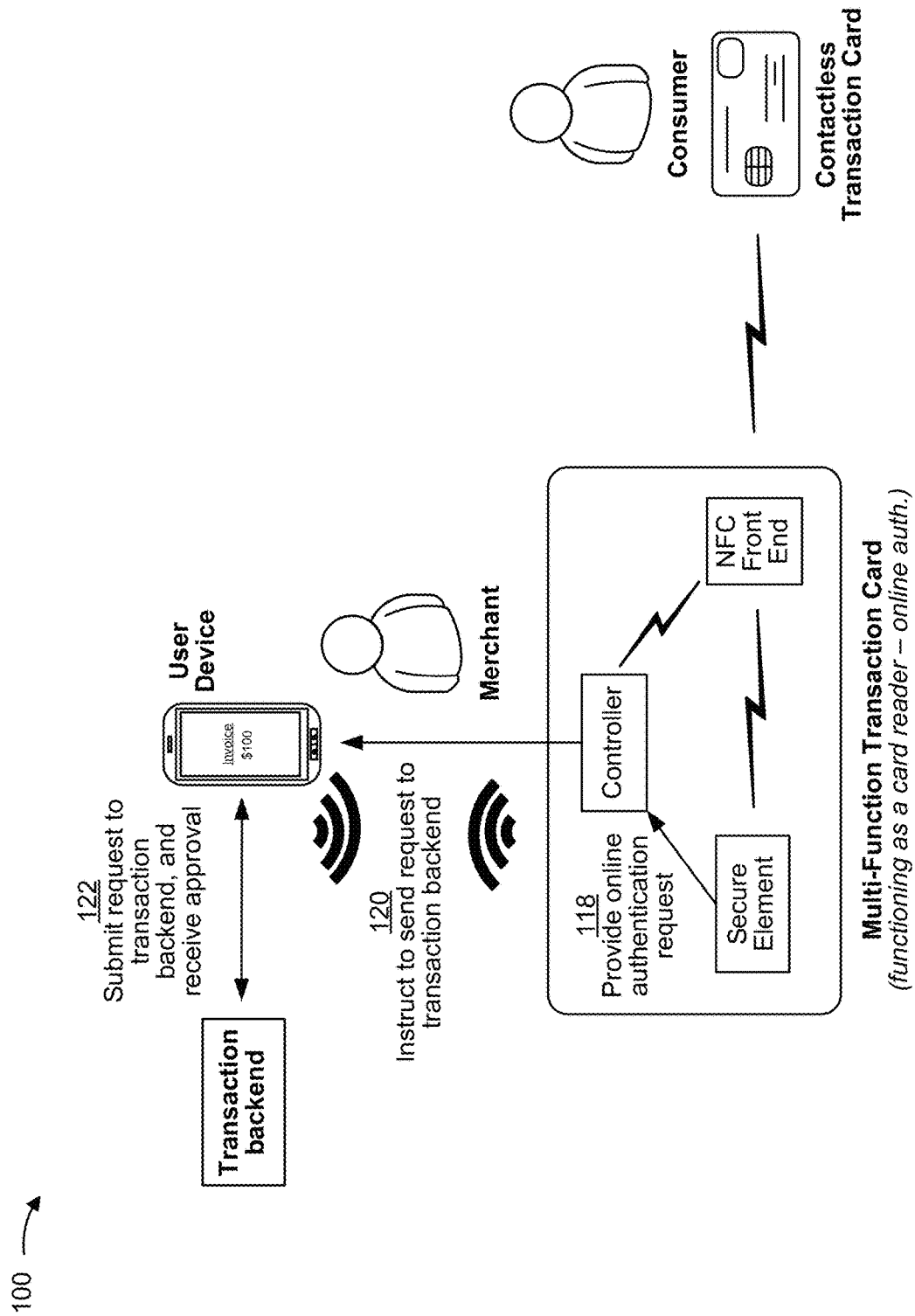

As shown in FIG. 1B, and as shown by reference number 118, the secure element may prepare and provide an online authentication request based on the card data received from the contactless transaction card. As shown by reference number 120, the controller may cause an instruction to be provided, to the user device, to send the online authentication request to the transaction backend for processing.

As shown by reference number 122, the user device may submit the online authentication request to the transaction backend (e.g., via a cellular network, a wireless local area network, such as Wi-Fi, and/or the like), and receive approval from the transaction backend. In a case where the transaction backend approves the transaction, the transaction may be complete. In some cases, the transaction backend may provide return data to the multi-function transaction card, which the multi-function transaction card may provide to the contactless transaction card for storage and/or record-updating purposes.

Figure 1C:
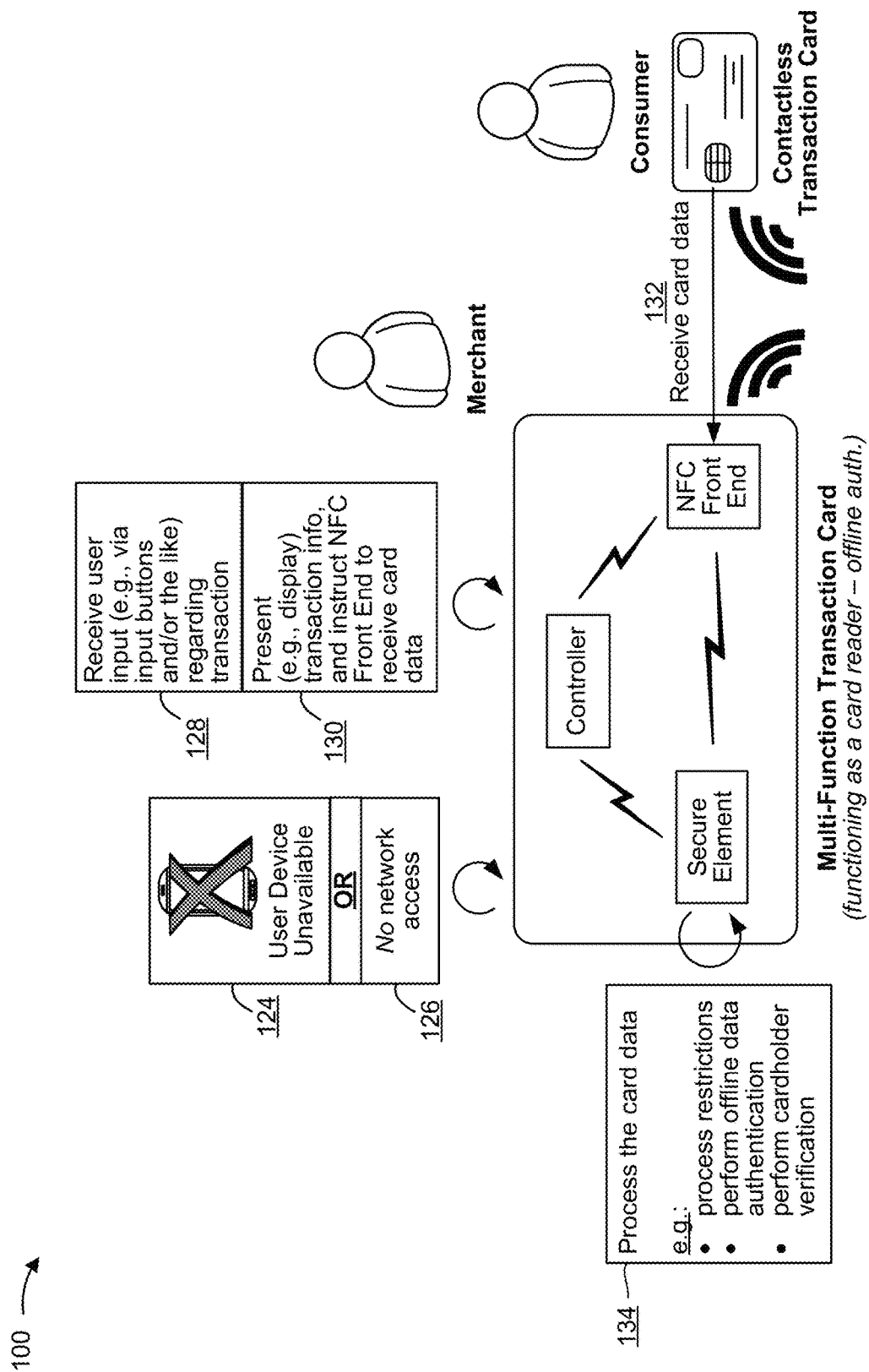

In some situations, as shown in FIG. 1C, and as shown by reference numbers 124 and 126, the user device may be unavailable (e.g., the merchant may not have access to the user device) or the user device may have no access to a network (e.g., the Internet). In such situations, the merchant may utilize the multi-function transaction card to perform offline data authentication of the consumer's contactless transaction card.

As shown by reference number 128, the multi-function transaction card may receive a user input regarding a transaction. For example, the merchant may input, into the multi-function transaction card (e.g., using input component(s), such as buttons and/or the like, of the multi-function transaction card), a transaction amount and/or the like. The controller may receive the input, and provide information regarding the transaction amount to the secure element. As shown by reference number 130, the multi-function transaction card may present the information, and instruct the NFC front end to receive card data from the contactless transaction card. In some implementations, the multi-function transaction card may include one or more displays (e.g., light-emitting diodes (LEDs), a dot matrix display, and/or the like). In such cases, the controller may cause the display(s) to present the information.

As shown by reference number 132, the multi-function transaction card (e.g., the NFC front end and the secure element) may receive the card data from the contactless transaction card (e.g., in a manner similar to that described above with respect to reference numbers 112 and 114). As shown by reference number 134, the secure element may process the card data. In some implementations, the secure element may process restrictions (e.g., by determining whether the EMV chip of the contactless transaction card is permitted to enter into the transaction), verify cardholder information (e.g., based on input of a PIN (e.g., an offline/online PIN), a signature, and/or the like), and/or perform one or more risk management checks (e.g., by determining a floor limit relating to the consumer's contactless transaction card, determining whether there is a requirement for online approval, and/or the like).

In some implementations, the secure element may utilize one or more offline data authentication protocols, such as static data authentication (SDA), dynamic data authentication (DDA), combined DDA with application cryptogram (CDA), and/or the like, to verify the authenticity of the consumer's contactless transaction card. In some implementations, the multi-function transaction card may receive keys (e.g., public keys) that the secure element can use, in accordance with an offline data authentication protocol, to process and authenticate the card data received from the contactless transaction card. In some implementations, the multi-function transaction card may receive the keys (e.g., periodically, continuously, based on user input, and/or the like) from one or more certification authorities (e.g., card issuers and/or the like), and store the keys in memory (e.g., in one or more non-volatile memories included in the secure element of the multi-function transaction card).

Figure 1D:
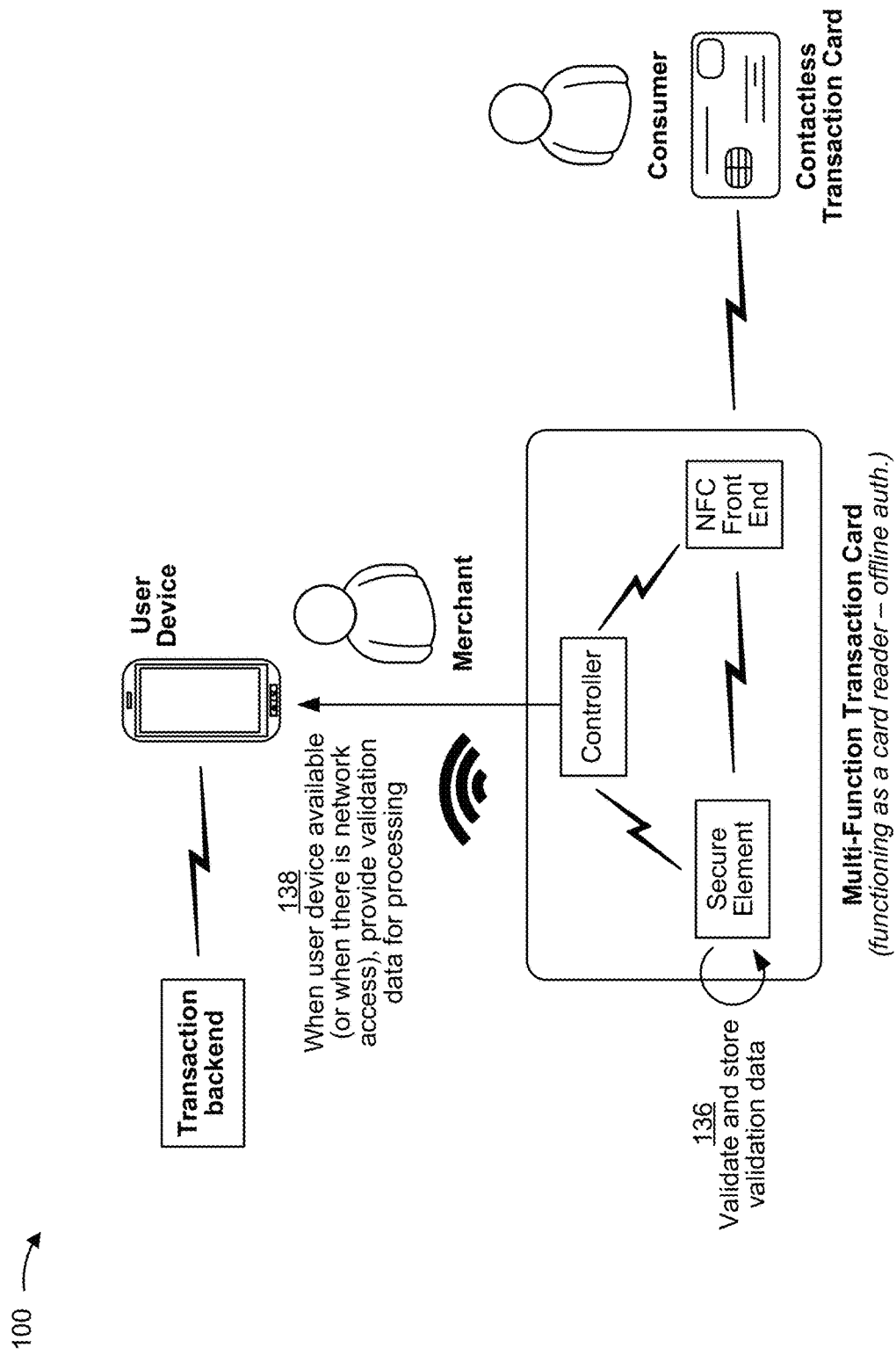

As shown in FIG. 1D, and as shown by reference number 136, the secure element may validate the contactless transaction card (e.g., based on processing the received card data), and store validation data in one or more non-volatile memories of the secured element. Additionally, or alternatively, and in a case where the multi-function transaction card includes an additional memory (e.g., one or more additional non-volatile memories, such as flash memory devices included in or accessible to the secure element and/or the controller, and/or the like), the secure element may store the validation data in such an additional memory.

Although not shown, in some implementations, the multi-function transaction card may include one or more output components, such as display(s) (e.g., as described above), speaker(s), and/or the like. In such cases, the secure element may provide, to the controller, an indication regarding a result of the validation, which the controller may cause the one or more output components to present to the user (e.g., the merchant). For example, the controller may cause a display on the multi-function transaction card to present a notification indicating that the consumer's contactless transaction card has been validated.

As shown by reference number 138, when the user device is available, or when the user device has access to a network (e.g., the Internet), the controller may provide, to the transaction backend, the validation data for processing. In some implementations, a user (e.g., the merchant) may provide one or more inputs (e.g., via input component(s) of the multi-function transaction card) to cause the controller to provide the validation data to the user device for submission to the transaction backend.

Figure 1E:
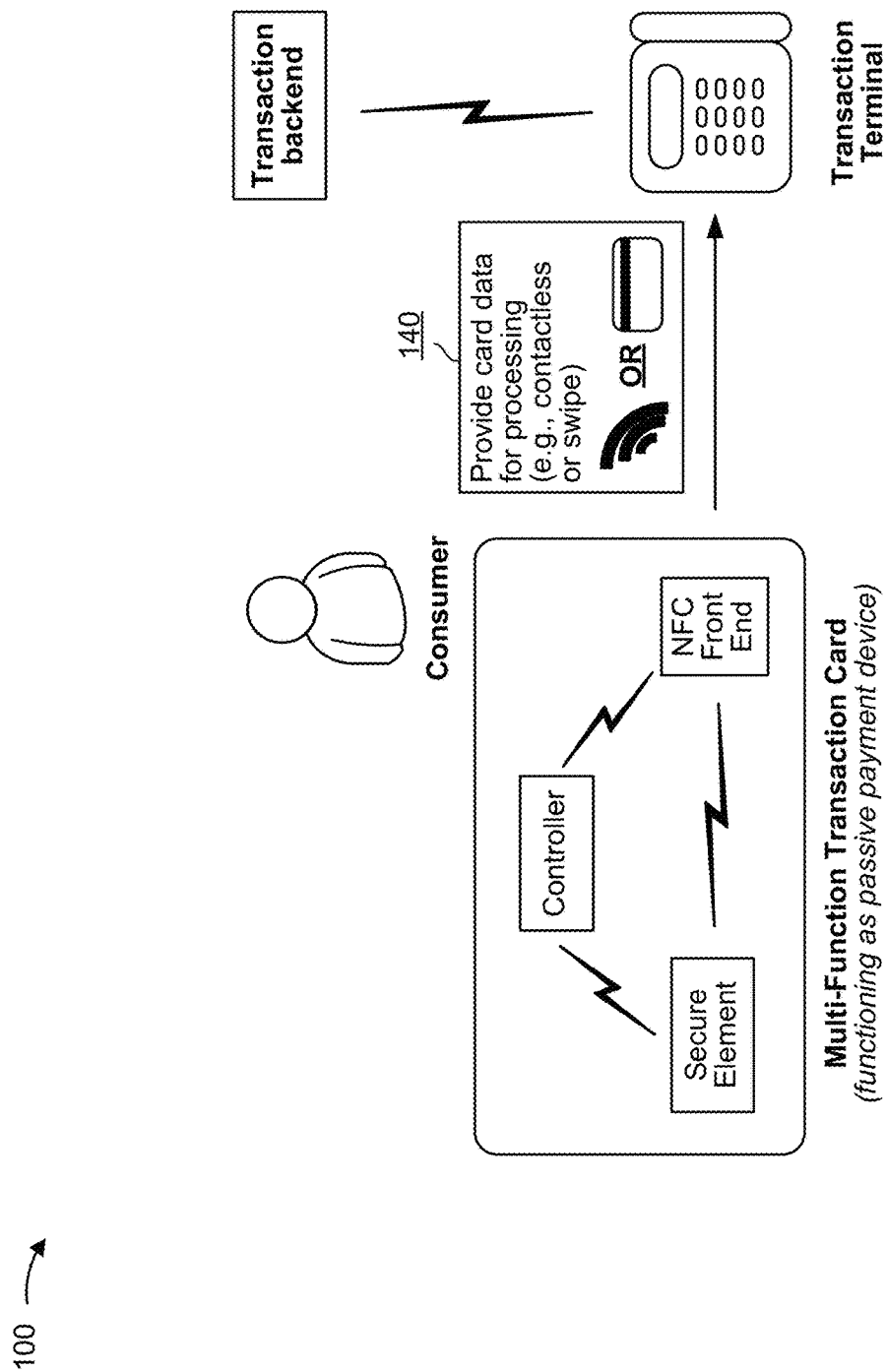

As described above, the multi-function transaction card may additionally be used as a payment card to submit payments. In such a case, the user of the multi-function transaction card may act as a consumer rather than as a merchant. As shown in FIG. 1E, and as shown by reference number 140, the multi-function transaction card may provide card data to a transaction terminal (e.g., that reads magnetic stripes, EMV chips (contact or contactless types), and/or the like) for processing. For example, the multi-function transaction card may obtain card data from the secure element of the multi-function transaction card, and provide the card data to the transaction terminal, in a manner similar to that described above with respect to reference number 112. In a case where the transaction terminal supports magnetic stripe transactions, the user may swipe the multi-function transaction card through the transaction terminal, in which case magnetic stripe data (e.g., containing a card number associated with the multi-function transaction card, information regarding an expiration date, and/or the like) may be provided to the transaction terminal for processing.

In some implementations, the multi-function transaction card may be loadable with cash value amounts, and may permit users to conduct cash-based transfers in peer-to-peer transactions (e.g., with one or more other multi-function transaction cards having the same capabilities as the multi-function transaction card). In such cases, the multi-function transaction card may enable a user to conduct a transfer using input/output component(s) of the multi-function transaction card, such as button(s) and display(s). For example, the user may initiate communicative coupling of the multi-function transaction card with another multi-function transaction card, input the appropriate cash value amount that is to be transferred from the multi-function transaction card to the other multi-function transaction card (or from the other multi-function transaction card to the multi-function transaction card), view transaction-related information, and/or the like.

In this way, a user can utilize a single, multi-function transaction card, in a familiar and widely used form factor, to both submit and accept payments. This reduces or eliminates a need for the user to procure, and carry around, a dedicated transaction card reader, which reduces costs. This also reduces or eliminates a need for the user to rely on a payment service provider to process transactions, which reduces transaction costs. In addition, a multi-function transaction card, that enables a user to conduct cash-based transfers, reduces or eliminates a need for the user to utilize third-party payment provider services, thereby also reducing transaction costs and improving overall transaction security.

As indicated above, FIGS. 1A-1E are provided merely as examples. Other examples are possible and may differ from what was described with regard to FIGS. 1A-1E. Although some implementations described herein apply to facilitating transactions between a multi-function transaction card and a contactless transaction card over an NFC protocol, the implementations apply equally, or similarly, to transactions that are facilitated in other manners, such as via near field magnetic induction, other radio-signal-based communication protocols (e.g., radio frequency identification (RFID)-based protocols, Bluetooth-based protocols, and/or the like), and/or the like. Furthermore, in some implementations, the multi-function transaction card may be implemented in another form factor, such as in a wearable form factor (e.g., a smartwatch or another wearable smart accessory).

Figure 2:
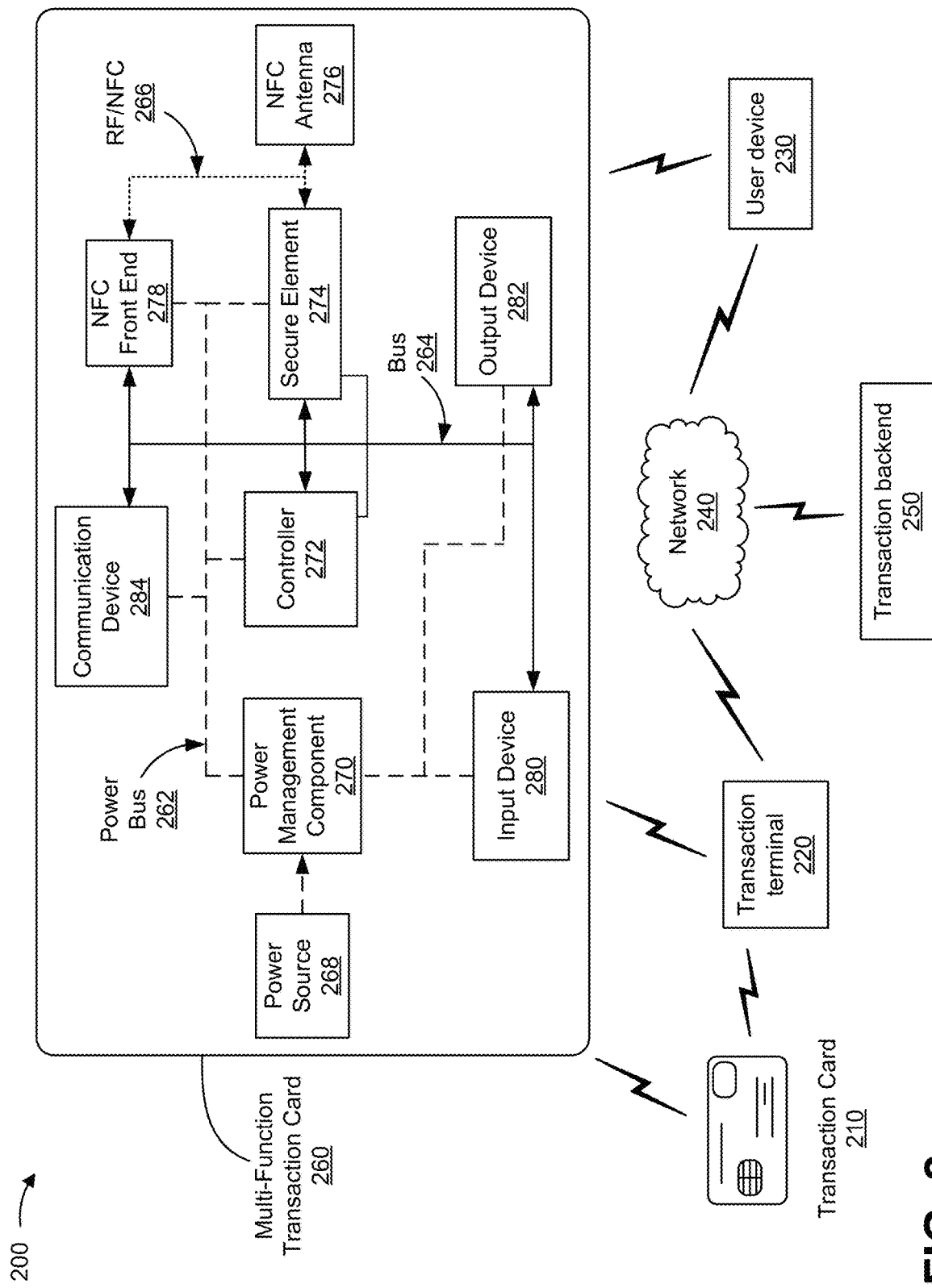
FIG. 2 is a diagram of an example environment in which systems, devices, and/or methods, described herein, may be implemented.

FIG. 2 is a diagram of an example environment 200 in which systems, devices, and/or methods, described herein, may be implemented. As shown in FIG. 2, environment 200 may include a transaction card 210, a transaction terminal 220, a user device 230, a network 240, a transaction backend 250, and a multi-function transaction card 260. Devices of environment 200 may interconnect via wired connections, wireless connections, or a combination of wired and wireless connections.

Transaction card 210 includes a transaction card capable of storing and/or communicating data for a PoS transaction with transaction terminal 220 and/or multi-function transaction card 260. For example, transaction card 210 may store or communicate data including account information (e.g., an account identifier, a cardholder identifier, etc.), expiration information of transaction card 210, banking information, transaction information (e.g., a payment token), and/or the like. For example, to store or communicate the data, transaction card 210 may include a magnetic stripe and/or an IC chip (e.g., an EMV chip and/or the like).

In some implementations, transaction card 210 may include an antenna to communicate data associated with transaction card 210. The antenna may be a passive radio frequency (RF) antenna, an active RF antenna, and/or a battery-assisted RF antenna. In some implementations, transaction card 210 may be a smart transaction card, capable of communicating wirelessly (e.g., via Bluetooth, Bluetooth Low Energy (BLE), near-field communication (NFC), and/or the like) with a computing device, such as transaction terminal 220 and/or multi-function transaction card 260, a digital wallet, and/or another device. In some implementations, transaction card 210 may communicate with transaction terminal 220 and/or multi-function transaction card 260 to complete a transaction (e.g., based on being moved within communicative proximity of transaction terminal 220 and/or multi-function transaction card 260).

Transaction terminal 220 includes one or more devices to facilitate processing a transaction via transaction card 210 and/or multi-function transaction card 260. Transaction terminal 220 may include a PoS terminal, a security access terminal, an ATM terminal, and/or the like. Transaction terminal 220 may include one or more input devices and/or output devices to facilitate obtaining transaction card data from transaction card 210 and/or multi-function transaction card 260, and/or interaction or authorization from a cardholder of transaction card 210 and/or multi-function transaction card 260. Example input devices of transaction terminal 220 may include a number keypad, a touchscreen, a magnetic stripe reader, a chip reader, and/or an RF signal reader. A magnetic stripe reader of transaction terminal 220 may receive transaction card data as a magnetic stripe of transaction card 210 and/or multi-function transaction card 260 is swiped along the magnetic stripe reader. A chip reader of transaction terminal 220 may receive transaction card data from an IC chip (e.g., an EMV chip) of transaction card 210 and/or multi-function transaction card 260 when the chip is placed in contact with the chip reader. An RF signal reader of transaction terminal 220 may enable contactless transactions from transaction card 210 and/or multi-function transaction card 260 by obtaining transaction card data wirelessly from transaction card 210 and/or multi-function transaction card 260 as transaction card 210 and/or multi-function transaction card 260 comes within a range of transaction terminal 220 at which the RF signal reader may detect an RF signal from an RF antenna of transaction card 210 and/or multi-function transaction card 260. Example output devices of transaction terminal 220 may include a display device, a speaker, a printer, and/or the like.

User device 230 includes one or more devices capable of receiving, generating, storing, processing, and/or providing information associated with transaction card 210 and/or multi-function transaction card 260. For example, user device 230 may include a communication device and/or a computing device, such as a mobile phone (e.g., a smart phone, a radiotelephone, etc.), a desktop computer, a laptop computer, a tablet computer, a handheld computer, a gaming device, a wearable communication device (e.g., a smart wristwatch, a pair of smart eyeglasses, etc.), or a similar type of device. In some implementations, user device 230 may include application logic capable of facilitating communications between transaction terminal 220 and multi-function transaction card 260.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

Transaction backend 250 includes one or more devices associated with banks and/or transaction card associations that authorize transactions and/or facilitate a transfer of funds or payments between an account of a cardholder of transaction card 210 and/or multi-function transaction card 260 and an account of an individual or business of transaction terminal 220. For example, transaction backend 250 may include one or more devices of one or more issuing banks associated with a cardholder of transaction card 210 and/or multi-function transaction card 260, one or more devices of one or more acquiring banks (or merchant banks) associated with transaction terminal 220, and/or one or more devices associated with one or more card associations (e.g., VISA®, MASTERCARD®, and/or the like) associated with transaction card 210 and/or multi-function transaction card 260. Accordingly, in response to receiving transaction card data associated with transaction card 210 and/or multi-function transaction card 260 from transaction terminal 220, various banking institutions and/or card associations of transaction backend 250 may communicate to authorize the transaction and/or transfer funds between the accounts associated with transaction card 210, multi-function transaction card 260, and/or transaction terminal 220.

In some implementations, transaction backend 250 may include one or more devices associated with security that may provide or deny authorization associated with transactions. For example, transaction backend 250 may store and/or provide security access information that may or may not allow access through an access point (e.g., a gate, a door, and/or the like) of a secure location (e.g., a room, a building, an geographical area, a transportation terminal, and/or the like) based on information (e.g., account information, a key, an identifier, credentials, and/or the like) associated with transaction card 210 and/or multi-function transaction card 260 and/or provided by transaction terminal 220.

In some implementations, transaction backend 250 may include one or more devices associated with a rewards program relating to transaction card 210, multi-function transaction card 260, and/or an entity (e.g., a bank, a merchant, a service provider, a vendor, and/or the like) associated with transaction card 210, multi-function transaction card 260, and/or transaction terminal 220. For example, transaction backend 250 may authorize the earning and/or redemption of rewards (e.g., rewards points associated with transaction card 210 and/or multi-function transaction card 260, cash rewards, client loyalty rewards associated with an entity associated with transaction terminal 220, and/or the like) based on a transaction processed by transaction terminal 220 with transaction card 210 and/or multi-function transaction card 260.

Multi-function transaction card 260 includes a transaction card capable of storing and/or communicating data for a PoS transaction with transaction terminal 220, and capable of receiving and/or storing data for a PoS transaction with transaction card 210. For example, multi-function transaction card 260 may store or communicate data including account information (e.g., an account identifier, a cardholder identifier, etc.), expiration information of multi-function transaction card 260, banking information, transaction information (e.g., a payment token), and/or the like. For example, to store or communicate the data, multi-function transaction card 260 may include a magnetic stripe and/or an IC chip (e.g., an EMV chip and/or the like).

In some implementations, multi-function transaction card 260 may include a card body in or on which various components are embedded. In some implementations, multi-function transaction card 260 may include an antenna to communicate data associated with transaction terminal 220 and/or transaction card 210. The antenna may be a passive RF antenna, an active RF antenna, and/or a battery-assisted RF antenna. In some implementations, multi-function transaction card 260 may be a smart transaction card, capable of communicating wirelessly (e.g., via Bluetooth, BLE, NFC, and/or the like) with a computing device, such as transaction terminal 220, transaction card 210, a digital wallet, and/or another device. In some implementations, multi-function transaction card 260 may communicate with transaction terminal 220, transaction card 210, and/or the like to complete a transaction (e.g., based on being moved within communicative proximity of transaction terminal 220, transaction card 210, and/or the like). In some implementations, multi-function transaction card 260 may include one or more components and/or one or more functionalities of transaction terminal 220 and/or one or more components and/or functionalities of transaction card 210.

Power bus 262 includes a component that permits the delivery of power to various components of multi-function transaction card 260. Bus 264 includes a component (e.g., a serial communication bus, such as a serial peripheral interface (SPI) bus, a universal asynchronous receiver-transmitter (UART)-based bus, a bus based on the inter-integrated circuit ($I^2C$) protocol, and/or the like) that permits communication among various components of multi-function transaction card 260. RF/NFC 266 may include a communication link that permits data delivery between secure element 274, NFC antenna 276, and NFC front end 278.

Power source 268 includes one or more devices, internal to multi-function transaction card 260, capable of supplying power. For example, power source 268 may include a battery (e.g., a rechargeable battery, a non-rechargeable battery, and/or the like), a power supply, a capacitor (e.g., a supercapacitor, an ultracapacitor, and/or the like), and/or the like. In some implementations, multi-function transaction card 260 (e.g., controller 272, secure element 274, and/or NFC front end 278) may obtain power from power source 268 when multi-function transaction card 260 is to perform a transaction. In some aspects, multi-function transaction card 260 may include a single power source 268, which may supply power for performing a transaction and/or may supply power to one or more other components of multi-function transaction card 260 (e.g., a processor, a storage component, an input component, an output component, a communication interface, and/or the like). In some aspects, multi-function transaction card 260 may include multiple power sources 268. In some aspects, a single power source 268 may be dedicated to supplying power solely for performing a transaction, while other power sources 268 may supply power to other components of multi-function transaction card 260. In some implementations, multi-function transaction card 260 may include one or more solar cells and associated circuitry that enable various components of multi-function transaction card 260 to be powered by solar energy.

Power management component 270 includes one or more devices capable of controlling the delivery of power to various components of multi-function transaction card 260 and/or controlling charging of power source 268. For example, power management component 270 may include a switch, a gate, a controller, a regulator, a processing component, and/or the like. In some implementations, power management component 270 may include a bidirectional logic level shifter to control signals between controller 272 and secure element 274 (e.g., to couple or decouple controller 272 and secure element 274, to prevent signals from being passed between controller 272 and secure element 274, and/or the like). Additionally, or alternatively, power management component 270 may include a diode (e.g., an ideal diode) and/or a switch (e.g., a load switch) to control signals between power source 268 and secure element 274 (e.g., to couple or decouple power source 268 and secure element 274, to prevent signals from being passed between power source 268 and secure element 274, and/or the like).

Controller 272 includes one or more devices capable of receiving, generating, storing, processing, and/or providing information and/or instructions that assist with performing a transaction. For example, controller 272 may include a processor, such as processor 320 described below in connection with FIG. 3. Additionally, or alternatively, controller 272 may include memory, such as memory 330 described below in connection with FIG. 3. In some implementations, controller 272 may be directly, communicatively coupled to secure element 274 (e.g., via a dedicated, single-wire communication link).

Secure element 274 includes one or more devices capable of securely hosting an operating system and/or an application, and/or storing confidential information (e.g., a credential, cryptographic information, and/or the like). For example, secure element 274 may include a universal integrated circuit card (UICC), a secure digital (SD) card (e.g., a microSD card and/or the like), an embedded secure element, and/or the like. In some implementations, secure element 274 may include a tamper resistant hardware platform. In some implementations, secure element 274 may include one or more processors (e.g., one or more microcontrollers) certified by a standard body group, such as an EMV Consortium (EMVCo) certified (e.g., 16-bit and/or the like) secure microcontroller.

In some implementations, secure element 274 may host a personalized card application and a cryptographic key required to perform a financial transaction (e.g., with transaction terminal 220). In some implementations, secure element 274 may receive a cryptographic key required to perform a financial transaction (e.g., with transaction card 210), as described elsewhere herein. In some implementations, secure element 274 may store a credential associated with multi-function transaction card 260, such as a username, a password, biometric information, a token, a certificate for signing documents, and/or the like. In some implementations, secure element 274 may store a credential (e.g., a username, a password, biometric information, a token, a certificate for signing documents, and/or the like) associated with another transaction card (e.g., transaction card 210), as described elsewhere herein.

In some implementations, secure element 274 may include application logic configured to communicate with NFC front end 278 (e.g., to cause NFC front end 278 to provide card data from secure element 274 to transaction terminal 220 to submit a payment, to cause NFC front end 278 to receive card data from another transaction card (e.g., transaction card 210) to process a payment, and/or the like). In some implementations, secure element 274 may include application logic configured to communicate with controller 272 (e.g., to cause controller 272 to communicate with a user device (e.g., user device 230) to facilitate online data authentication relating to a transaction (e.g., with transaction card 210), to receive instructions from controller 272 to initiate transaction processing (e.g., associated with transaction card 210), and/or the like). In some implementations, secure element 274 may include application logic configured to receive inputs from input device 280 (e.g., directly or via controller 272), to provide outputs to output device 282 (e.g., directly or via controller 272), and/or the like.

NFC antenna 276 includes an antenna capable of transmitting and/or receiving information using an NFC protocol. For example, NFC antenna 276 may include a loop antenna (e.g., an NFC loop antenna), an inductor (e.g., an NFC inductor), and/or the like. In some implementations, NFC antenna 276 may be integrated into, or with, secure element 274 and/or NFC front end 278 (e.g., may be part of the same integrated circuit, such as a transaction IC).

NFC front end 278 includes one or more devices capable of communicating with external devices, such as transaction card 210 and/or transaction terminal 220, using an NFC protocol. NFC front end 278 may be communicatively coupled to secure element 274, and configured to obtain card data from secure element 274 and provide the card data to transaction terminal 220, as described elsewhere herein. In some implementations, NFC front end 278 may be configured to receive card data from transaction card 210 and provide the card data to secure element 274 for processing, as described elsewhere herein.

NFC front end 278 may include one or more radio modules for receiving and/or emitting NFC signals. NFC front end 278 may include one or more processors (e.g., microprocessor(s), microcontroller(s), and/or the like) and/or be coupled to one or more processors, such as controller 272, processor(s) included in secure element 274, and/or the like.

Although not shown, in some implementations, multi-function transaction card 260 may include a transaction IC that includes an integrated circuit connecting secure element 274, NFC antenna 276, and/or one or more other components of multi-function transaction card 260. For example, the transaction IC may include secure element 274, NFC antenna 276, NFC front end 278, connection(s) between secure element 274, NFC antenna 276, and NFC front end 278, and/or the like.

Input device 280 includes one or more components that permit multi-function transaction card 260 to receive information, such as via user input (e.g., to initiate a transaction, such as to receive card data from transaction card 210). For example, input device 280 may include an input component, such as input component 350 described below in connection with FIG. 3. For example, input device 280 may include an accelerometer, pushbutton(s), touch sensor(s), keypad input(s), and/or the like.

Output device 282 includes one or more components that permit multi-function transaction card 260 to provide output information (e.g., relating to transaction processing associated with transaction card 210 and/or transaction terminal 220). For example, output device 282 may include an output component, such as output component 360 described below in connection with FIG. 3. For example, output device 282 may include dot matrix display(s), one or more LEDs (e.g., printed organic LEDs), and/or the like.

Communication device 284 includes a transceiver-like component that enables multi-function transaction card 260 to communicate with other devices. For example, communication device 284 may include a communication interface, such as communication interface 370 described below in connection with FIG. 3. In some implementations, communication device 284 may include a Bluetooth communication interface, a BLE communication interface, and/or the like. In some implementations, communication device 284 may be included in, or integrated with, controller 272.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
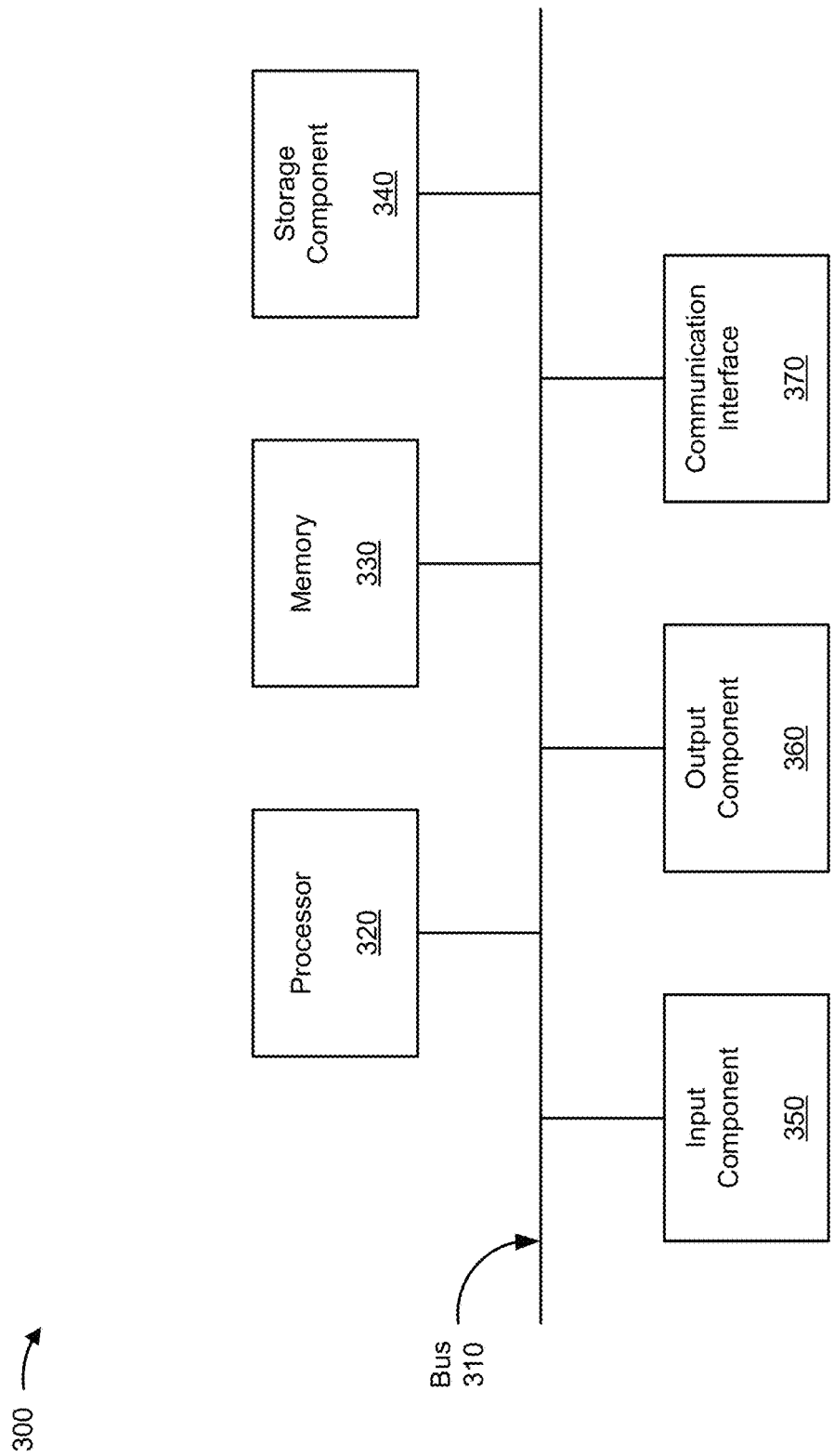
FIG. 3 is a diagram of example components of one or more devices of FIG. 2.

FIG. 3 is a diagram of example components of a device 300. Device 300 may correspond to transaction card 210, transaction terminal 220, user device 230, transaction backend 250, and/or multi-function transaction card 260. In some implementations, transaction card 210, transaction terminal 220, user device 230, transaction backend 250, and/or multi-function transaction card 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more LEDs).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, an RF interface, a universal serial bus (USB) interface, a wireless local area interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
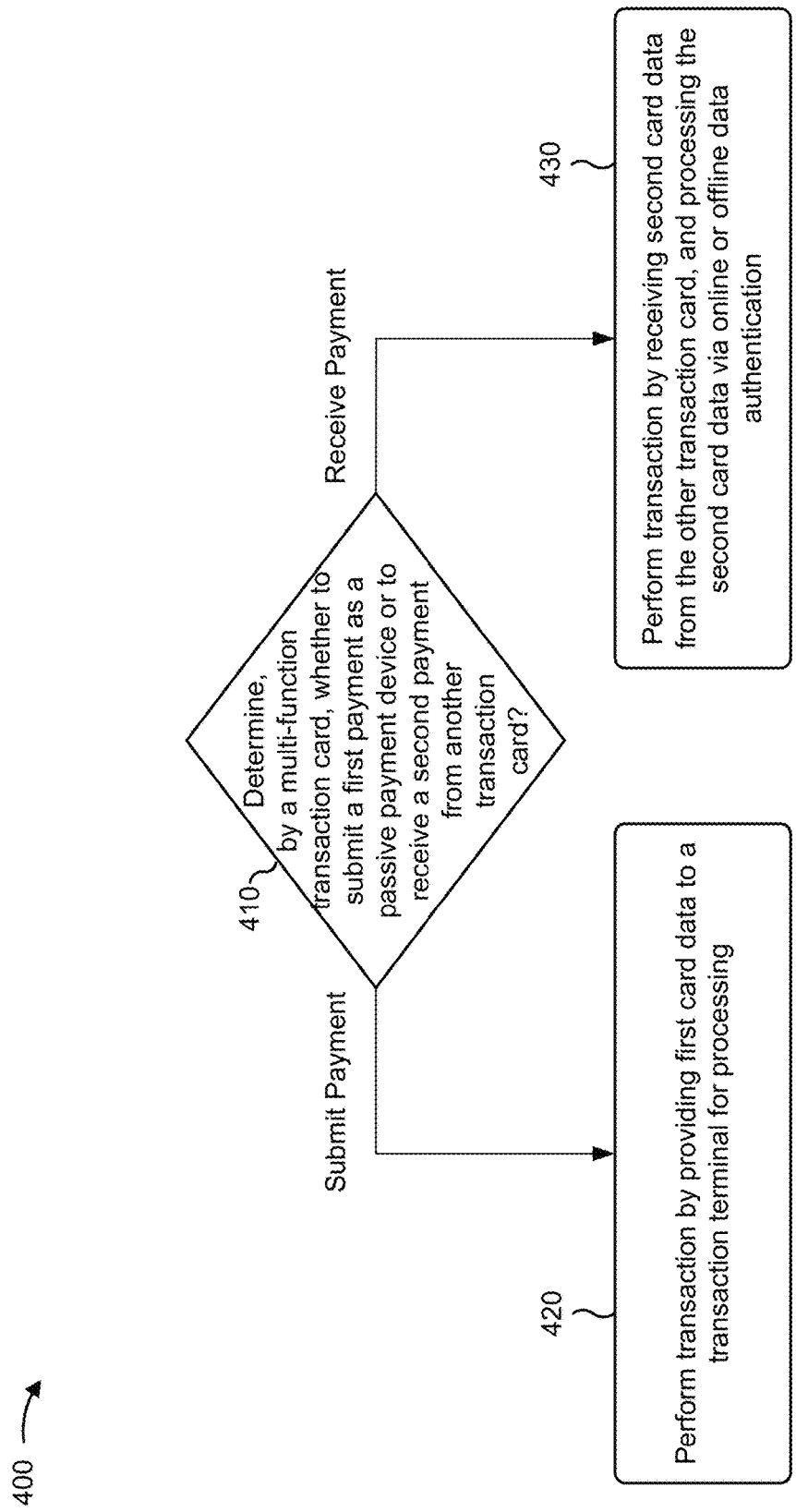
FIG. 4 is a flow chart of an example process for performing a transaction using a multi-function transaction card.

FIG. 4 is a flow chart of an example process 400 for performing a transaction using a multi-function transaction card. In some implementations, one or more process blocks of FIG. 4 may be performed by multi-function transaction card 260. In some implementations, one or more process blocks of FIG. 4 may be performed by another device or a group of devices separate from or including multi-function transaction card 260, such as transaction card 210, transaction terminal 220, user device 230, and/or transaction backend 250.

As shown in FIG. 4, process 400 may include determining, by a multi-function transaction card (e.g., multi-function transaction card 260), whether to submit a first payment as a passive payment device or to receive a second payment from another transaction card (e.g., transaction card 210) (block 410). For example, multi-function transaction card 260 (e.g., using secure element 274, controller 272, processor 320, memory 330, storage component 340, and/or the like) may determine whether to submit a first payment as a passive payment device or to receive a second payment from another transaction card (e.g., transaction card 210), as described above in connection with FIGS. 1A-1E. In some implementations, the multi-function transaction card may have a length and a width that are in accordance with a standard for transaction cards. In some implementations, the multi-function transaction card may selectively perform a payment transaction based on determining whether to submit the first payment or to receive the second payment.

As further shown in FIG. 4, process 400 may include performing the payment transaction by providing first card data to a transaction terminal (e.g., transaction terminal 220) for processing when the multi-function transaction card is to submit the first payment (block 420). For example, multi-function transaction card 260 (e.g., using secure element 274, controller 272, processor 320, memory 330, storage component 340, and/or the like) may perform the payment transaction by providing first card data to transaction terminal 220 for processing when multi-function transaction card 260 is to submit the first payment, as described above in connection with FIGS. 1A-1E.

As further shown in FIG. 4, process 400 may include performing the payment transaction by receiving second card data from the other transaction card, and processing the second card data via online data authentication, or via offline data authentication, when the multi-function transaction card is to receive the second payment (block 430). For example, multi-function transaction card 260 (e.g., using secure element 274, controller 272, processor 320, memory 330, storage component 340, and/or the like) may perform the payment transaction by receiving second card data from the other transaction card (e.g., transaction card 210), and processing the second card data via online data authentication, or via offline data authentication, when multi-function transaction card 260 is to receive the second payment, as described above in connection with FIGS. 1A-1E.

Process 400 may include additional implementations, such as any single implementation or any combination of implementations described below and/or in connection with one or more other processes described elsewhere herein.

In some implementations, the multi-function transaction card may obtain a user instruction to receive the second payment. In some implementations, determining whether to submit the first payment or to receive the second payment may include determining to receive the second payment based on obtaining the user instruction. In some implementations, the multi-function transaction card may obtain a payment instruction from a transaction terminal. In some implementations, determining whether to submit the first payment or to receive the second payment may include determining to submit the first payment based on obtaining the payment instruction.

In some implementations, the length may be in a range from 85 millimeters to 86 millimeters. In some implementations, the width may be in a range from 53 millimeters to 54 millimeters.

In some implementations, a transaction card device (e.g., multi-function transaction card 260) may include a card body having dimensions that are in accordance with a standard for payment cards, a host controller (e.g., controller 272) configured to communicate with user devices (e.g., user devices 230), an NFC element (e.g., NFC front end 278) configured to communicate with NFC-enabled devices, and a secure element (e.g., secure element 274) communicatively coupled to the host controller and the NFC element. In some implementations, the secure element may include one or more memories (e.g., memory 330). In some implementations, the one or more memories may store first data regarding the transaction card device. In some implementations, the secure element may include one or more processors (e.g., processor 320), communicatively coupled to the one or more memories, configured to, based on a request, received by the NFC element and from a first NFC-enabled device, to provide the first data in relation to a first transaction, cause the NFC element to transmit the first data to the first NFC-enabled device. In some implementations, the one or more processors may be configured to, based on an instruction to obtain, from a second NFC-enabled device, second data in relation to a second transaction, cause the NFC element to obtain the second data from the second NFC-enabled device, and perform online data authentication of the second NFC-enabled device, or offline data authentication of the second NFC-enabled device, based on the second data.

In some implementations, the standard may include ISO/IEC 7810 ID-1. In some implementations, the first NFC-enabled device may include a transaction terminal. In some implementations, the second NFC-enabled device may include a contactless transaction card. In some implementations, the transaction card device may include a communication interface configured to enable communications between the host controller and the user devices.

In some implementations, the one or more processors, when performing the online data authentication or the offline data authentication, may be configured to perform the online data authentication, or the offline data authentication, in accordance with an EMV standard. In some implementations, the NFC element may include at least one of an NFC front end or an NFC controller. In some implementations, the first data or the second data may include information stored in a magnetic stripe, or information associated with an EMV standard.

In some implementations, the one or more processors may be further configured to identify that there lacks an active connection between the host controller and a user device. In some implementations, the one or more processors, when performing the offline data authentication, may be configured to perform the offline data authentication based on identifying that there lacks the active connection.

In some implementations, the one or more processors may be further configured to identify that a user device, to which the host controller is communicatively coupled, lacks access to a network. In some implementations, the one or more processors, when performing the offline data authentication, may be configured to perform the offline data authentication based on identifying that the user device lacks access to the network.

In some implementations, the one or more processors, when performing the offline data authentication, may be further configured to process the second data to generate validation data. In some implementations, the one or more processors, when performing the online data authentication, may be further configured to cause the host controller to provide the second data to a user device for submission to a transaction backend for approval.

In some implementations, a transaction apparatus (e.g., multi-function transaction card 260) may include an enclosure having dimensions that are in accordance with a standard for payment cards, a main controller (e.g., controller 272), a communication element (e.g., NFC front end 278) configured to communicate with contactless transaction devices (e.g., transaction cards 210), and a secure element (e.g., secure element 274) communicatively coupled to the main controller and the communication element. In some implementations, the secure element may include one or more memories (e.g., memory 330) storing first data regarding the transaction apparatus. In some implementations, the transaction apparatus may include one or more processors (e.g., processor 320), communicatively coupled to the one or more memories, configured to, based on an instruction to obtain second data, from a particular contactless transaction device, in relation to a particular transaction, cause the communication element to obtain the second data from the particular contactless transaction device, and perform online data authentication of the particular contactless transaction device, or offline data authentication of the particular contactless transaction device, based on the second data.

In some implementations, the one or more processors may be further configured to, based on a request, received by the communication element and from another contactless transaction device, to provide the first data in relation to another transaction, cause the communication element to transmit the first data to the other contactless transaction device.

In some implementations, the transaction apparatus may include an additional communication element communicatively coupled to the main controller. In some implementations, the additional communication element may be configured to communicate with user devices (e.g., user devices 230). In some implementations, the instruction may be received, by the additional communication element, from a user device.

In some implementations, the one or more processors may be further configured to receive, from a payment processor (e.g., transaction terminal 220), a private key associated with the particular contactless transaction device. In some implementations, the one or more processors, when performing the offline data authentication of the particular contactless transaction device, may be configured to perform the offline data authentication of the particular contactless transaction device based on receiving the private key.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations, described herein, provide a multi-function transaction card 260 that is capable of interacting with a transaction terminal 220 to submit payments, and interacting with other transaction cards (e.g., transaction cards 210) to receive payments. In some implementations, multi-function transaction card 260, when functioning as a transaction card reader (e.g., a smart card reader), is capable of conducting online or offline data authentication of a transaction card 210 (e.g., in accordance with EUROPAY®, MASTERCARD®, VISA® (EMV)-based procedures). For example, multi-function transaction card 260 is capable of providing card data, relating to transaction card 210, to a user device 230 for forwarding to a transaction backend for processing. As another example, multi-function transaction card 260 is capable of performing offline data authentication of transaction card 210, and storing (e.g., locally) resulting validation information for submission (e.g., via user device 230) to a transaction backend 250 at a later point. In some implementations, multi-function transaction card 260 is capable of permitting a user to conduct cash-based transfers (e.g., with one or more other multi-function transaction cards having the same capabilities) in peer-to-peer transactions. In some implementations, multi-function transaction card 260 is implemented in a form factor that is in accordance with a standard for transaction cards (e.g., ISO/IEC 7810 ID-1).

In this way, a user can utilize a single, multi-function transaction card, in a familiar and widely used form factor, to both submit and accept payments. This reduces or eliminates a need for the user to procure, and carry around, a dedicated transaction card reader, which reduces costs. This also reduces or eliminates a need for the user to rely on a payment service provider to process transactions, which reduces transaction costs. In addition, a multi-function transaction card, that enables a user to conduct cash-based transfers, reduces or eliminates a need for the user to utilize third-party payment provider services, thereby also reducing transaction costs and improving overall transaction security.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A transaction card, comprising:
   a host controller;
   a wireless interface element;
   a near field communication (NFC) element;
   a secure element, communicatively coupled to the host controller and the NFC element, and comprising:
      one or more memories; and
      one or more processors communicatively coupled to the one or more memories; and
   a card body having dimensions that are in accordance with a standard for payment cards, the host controller being configured to:
receive, from a user device associated with a merchant, an instruction to initialize a card reading functionality;
the NFC element being configured to:
receive, from a transaction terminal associated with the merchant, a request to provide first data in relation to a first transaction; and
the one or more processors, of the secure element, being configured to:
cause, based on the request, the NFC element to transmit the first data to the transaction terminal;
cause, based on the card reading functionality being initialized, the NFC element to receive second data, in relation to a second transaction, from a contactless transaction card associated with a consumer;
determine whether an active connection exists between the host controller and the user device; and
when the active connection exists between the host controller and the user device, perform online data authentication by:
causing, by the secure element, the host controller to provide an instruction to the user device to send an online data authentication request to a transaction backend, associated with the transaction card or the contactless transaction card, to process the second data, and
receiving, by the secure element, return data based on the transaction backend processing the second data, or
when the active connection does not exist between the host controller and the user device, perform offline data authentication by:
using, by the secure element, one or more offline data authentication protocols to authenticate the second data from the contactless transaction card, and
storing, by the secure element, authenticated second data.

2. The transaction card of claim 1, wherein the user device is a first NFC-enabled device and the transaction terminal is a second NFC-enable device.

3. The transaction card of claim 1, further comprising a communication interface configured to enable communications between the host controller and the user device.

4. The transaction card of claim 1, wherein the NFC element includes at least one of an NFC front end or an NFC controller.

5. The transaction card of claim 1, wherein the first data or the second data includes:
information stored in a magnetic stripe.

6. The transaction card of claim 1,
wherein the one or more processors are further configured to:
receive a user input regarding the second transaction; and
wherein the one or more processors, when performing the offline data authentication, are configured to:
perform the offline data authentication based on receiving the user input.

7. The transaction card of claim 1, wherein the one or more processors, when determining whether the active connection exists between the host controller and the user device, are configured to:

determine that the active connection does not exist between the host controller and the user device based on determining that the user device lacks access to a network.

8. The transaction card of claim 1, wherein the one or more processors, when processing the second data via the online data authentication, are configured to:
cause the host controller to provide the second data to the user device for submission to the transaction backend for approval,
the transaction backend being one or more devices associated with a bank or one or more transaction card associations that facilitate a transfer of funds between an account of the consumer associated with the contactless transaction card and an account of the merchant associated with the transaction terminal.

9. The transaction card of claim 1, wherein the one or more processors are further configured to:
receive, from a payment processor, a private key associated with the contactless transaction card; and
wherein the one or more processors, when performing the offline data authentication, are configured to:
process the second data via the offline data authentication based on receiving the private key.

10. The transaction card of claim 1, wherein the one or more processors, when performing the offline data authentication, are configured to:
utilize one or more of static data authentication (SDA), dynamic data authentication (DDA), or application cryptogram (CDA) to verify authenticity of the contactless transaction card.

11. The transaction card of claim 1, wherein the one or more processors are further configured to:
cause, based on the card reading functionality being initialized, the NFC element to obtain third data, in relation to a third transaction, from another device,
the other device being an NFC-enabled device.

12. The transaction card of claim 1, wherein the transaction backend authorizes earning of rewards associated with contactless transaction card based on the second transaction.

13. The transaction card of claim 1, wherein the second data includes one or more of:
account information, or
security information.

14. A transaction apparatus, comprising:
a main controller;
a wireless interface element;
a communication element;
a secure element, communicatively coupled to the main controller and the communication element, and comprising:
one or more memories; and
one or more processors communicatively coupled to the one or more memories; and
an enclosure having dimensions that are in accordance with a standard for payment cards,
the main controller being configured to:
receive, from a user device associated with a merchant, an instruction to initialize a card reading functionality;
the communication element being configured to:
receive from a backend contactless transaction device associated with the merchant, a request to provide first data in relation to a first transaction; and the one or more processors, of the secure element, being configured to:

cause, based on the request, the communication element to transmit the first data to the backend contactless transaction device;

cause, based on the card reading functionality being initialized, the communication element to obtain second data, in relation to a second transaction, from a contactless transaction card associated with a consumer;

determine whether an active connection exists between the main controller and the user device; and when the active connection exists between the main controller and the user device, perform online data authentication by:
- causing, by the secure element, the communication element to provide an instruction to the user device to send an online data authentication request to the backend contactless transaction device, associated with the transaction apparatus or the contactless transaction card, to process the second data, and
- receiving, by the secure element, return data based on the backend contactless transaction device processing the second data, or when the active connection does not exist between the main controller and the user device, perform offline data authentication by:
  - using, by the secure element, one or more offline data authentication protocols to authenticate the second data from the contactless transaction card, and
  - storing, by the secure element, authenticated second data.

15. The transaction apparatus of claim 14, wherein the backend contactless transaction device includes a transaction terminal and is an NFC-enabled device.

16. The transaction apparatus of claim 14, wherein the one or more processors are further configured to:
- receive, from a payment processor, a private key associated with the backend contactless transaction device; and
- wherein the one or more processors, when performing the offline data authentication, are configured to:
  - perform the offline data authentication based on receiving the private key.

* * * * *